US012000504B1

(12) United States Patent
Quan et al.

(10) Patent No.: US 12,000,504 B1
(45) Date of Patent: Jun. 4, 2024

(54) MULTIFUNCTIONAL ELECTRO-HYDRAULIC FLOW CONTROL VALVE AND FLOW CONTROL METHOD

(71) Applicant: TAIYUAN UNIVERSITY OF TECHNOLOGY, Taiyuan (CN)

(72) Inventors: Long Quan, Taiyuan (CN); Xingyu Zhao, Taiyuan (CN); Lei Ge, Taiyuan (CN); Weinan Huang, Taiyuan (CN); Bo Wang, Taiyuan (CN)

(73) Assignee: TAIYUAN UNIVERSITY OF TECHNOLOGY, Taiyuan (CN)

( * ) Notice: Subject to any disclaimer, the term of this patent is extended or adjusted under 35 U.S.C. 154(b) by 0 days.

(21) Appl. No.: 18/506,926

(22) Filed: Nov. 10, 2023

(30) Foreign Application Priority Data

Dec. 7, 2022 (CN) .......................... 202211561224.0

(51) Int. Cl.
*F16K 37/00* (2006.01)
*F15B 13/04* (2006.01)
(Continued)

(52) U.S. Cl.
CPC ...... *F16K 37/0083* (2013.01); *F15B 13/0402* (2013.01); *F15B 13/043* (2013.01);
(Continued)

(58) Field of Classification Search
CPC ............... F16K 37/0041; F16K 37/005; F16K 37/0083; F16K 31/383; F16K 31/426;
(Continued)

(56) References Cited

U.S. PATENT DOCUMENTS

| 10,774,849 B1 | 9/2020 | Zähe |
| 2006/0217898 A1* | 9/2006 | Pernestal ............ F16K 37/0083 702/41 |

(Continued)

FOREIGN PATENT DOCUMENTS

| CN | 101929482 A | 12/2010 |
| CN | 108612712 A | 10/2018 |

(Continued)

OTHER PUBLICATIONS

Huang Jiahai et al., "Characteristic of electro-hydraulic proportional cartridge inserted value based on flow amplifier", Journal of Chongqing University, No. 04, Aug. 15, 2016.

*Primary Examiner* — Atif H Chaudry

(57) ABSTRACT

A multifunctional electro-hydraulic flow control valve and a flow control method. The control valve comprises a main valve, a proportional pilot valve, a flow sensor, a multifunctional valve controller, a control cavity pressure sensor, an oil inlet pressure sensor, an oil outlet pressure sensor, a temperature sensor and a cloud storage. The invention has the characteristics that a flow of the main valve is continuously controlled without being influenced by load change without installing a pressure compensator in the system, and meanwhile, the valve has the function of a flow sensor, has low pressure loss and wide flow control range, and realizes integration of flow detection and control; and information such as flow, power and efficiency of each part in a hydraulic system is monitored in real time based on a multifunctional controller, key operation state monitoring, service life prediction and fault positioning of the control valve are achieved.

5 Claims, 2 Drawing Sheets

(51) Int. Cl.
*F15B 13/043* (2006.01)
*F15B 13/044* (2006.01)
*F15B 19/00* (2006.01)
*F16K 31/383* (2006.01)
*F16K 31/40* (2006.01)
*F16K 31/42* (2006.01)
*G05D 7/06* (2006.01)

(52) U.S. Cl.
CPC ...... *F15B 13/0431* (2013.01); *F15B 13/0433* (2013.01); *F15B 13/0435* (2013.01); *F15B 13/044* (2013.01); *F15B 19/005* (2013.01); *F16K 31/383* (2013.01); *F16K 31/406* (2013.01); *F16K 31/42* (2013.01); *F16K 31/423* (2013.01); *F16K 31/426* (2013.01); *F16K 37/0041* (2013.01); *F16K 37/005* (2013.01); *G05D 7/0635* (2013.01); *F15B 2211/327* (2013.01); *F15B 2211/328* (2013.01); *F15B 2211/329* (2013.01); *F15B 2211/87* (2013.01)

(58) Field of Classification Search
CPC ...... F16K 31/406; F16K 31/42; F16K 31/423; G05D 7/0635; F15B 13/0402; F15B 13/0433; F15B 13/0435; F15B 19/005; F15B 13/043; F15B 2211/329; F15B 13/0431; F15B 2211/327; F15B 2211/328
See application file for complete search history.

(56) References Cited

U.S. PATENT DOCUMENTS

| | | | | |
|---|---|---|---|---|
| 2009/0302245 | A1* | 12/2009 | Lernmark | F16K 31/406 251/24 |
| 2014/0264101 | A1* | 9/2014 | Perotto | F16K 31/406 251/28 |
| 2014/0305298 | A1* | 10/2014 | Beck | F15B 19/005 91/1 |
| 2022/0154844 | A1* | 5/2022 | Renollett | F02M 21/023 |
| 2023/0349486 | A1* | 11/2023 | Smart | F16K 37/0083 |

FOREIGN PATENT DOCUMENTS

| | | |
|---|---|---|
| CN | 111396422 A | 7/2020 |
| EP | 0681100 A2 | 11/1995 |
| JP | H09177711 A | 7/1997 |

* cited by examiner

MULTIFUNCTIONAL ELECTRO-HYDRAULIC FLOW CONTROL VALVE AND FLOW CONTROL METHOD

CROSS REFERENCE TO RELATED APPLICATIONS

This application claims foreign priority of Chinese Patent Application No. 202211561224.0, filed on Dec. 7, 2022 in the China National Intellectual Property Administration, the disclosures of all of which are hereby incorporated by reference.

TECHNICAL FIELD

The present invention belongs to the technical field of hydraulic control, and particularly relates to a multifunctional electro-hydraulic flow control valve and a flow control method capable of continuously controlling a flow entering an actuator in a hydraulic system and performing real-time state monitoring and fault diagnosis.

BACKGROUND OF THE PRESENT INVENTION

As a core control element in hydraulic transmission, a flow valve is widely applied to various heavy equipment, which is a key for realizing automation and intelligence of various heavy equipment, and a core function of the flow valve is to indirectly control movement of a hydraulic actuator through high-precision control over valve port flow. In order not to be affected by load changes, a control mode of the existing flow valve is that a pressure compensator is arranged in a main runner of a proportional throttle valve, a pressure difference between two ends of an oil inlet and an oil outlet of the valve is maintained to be basically constant, but the oil liquid needs to pass through a main valve and the pressure compensator for secondary throttling, so that a throttling loss of the valve is increased, a through-flow capacity of the valve is reduced, flow control precision is low due to steady-state hydraulic power, and dynamic flow overshoot in a normally open mode is large.

Reducing energy consumption of the hydraulic system and achieving closed-loop control of flow cannot be separated from flow measurement. Theoretically, if there is a sensor similar to the pressure sensor, which is easy to install and can dynamically detect the flow with high precision, the flow can be controlled with high precision through closed loop, and is not affected by the change of load pressure. However, the existing flow sensor has slow dynamic response and low flow detection accuracy, so it is difficult to perceive the flow in real time. In addition, when the flow sensor is used, it needs to be connected in series in a pipeline, which causes great pressure loss and the cost of the flow sensor itself is very high. At present, the flow sensor is mainly used in metering and testing systems. When this measurement method is used for closed-loop flow control, once the sensor fails, the whole system will not continue to work.

An existing electro-hydraulic proportional valve is low in intelligent degree, does not have self-learning self-adaptive capacity for loads, environments and changes of the existing electro-hydraulic proportional valve, cannot predict and diagnose health conditions of the valve, and is maintained after an accident, so that safety accidents and economic losses are caused. In addition, historical fusion data are not used for analysis, calculation, comparison and decision making, so that resource waste is caused, and the control precision of the valve is low.

SUMMARY OF THE PRESENT INVENTION

In order to solve the above problems in the prior art, the present invention provides a multi-functional electro-hydraulic flow control valve and a flow control method, which are used for detecting and closed-loop controlling of a pilot-stage flow by utilizing the characteristics of fast dynamic response of a small flow sensor in the prior art, and realizing high-precision control and detection of a flow of a main valve with low pressure loss through a principle of amplifying the pilot-stage flow by the main valve, which also enables the flow control valve to have the functions of data display, storage, analysis, calculation, judgment and the like. Stored data are uploaded to a cloud storage through a communication interaction module, and functions of valve parameter configuration, life prediction, fault diagnosis, self-learning and self-adaptation are realized, so as to solve the problems raised in the background.

In order to achieve the above purpose, the following technical solution is adopted: a multifunctional electro-hydraulic flow control valve comprises a main valve 2 and a proportional pilot valve 12, wherein a flow sensor, a multifunctional valve controller 21, a control cavity pressure sensor 17, an oil inlet pressure sensor 18, an oil outlet pressure sensor 19, a temperature sensor 20, and a cloud storage 30 are additionally provided;

the main valve 2 comprises a main valve core 1, a main valve spring 3, a main valve oil inlet cavity $V_A$, a main valve oil outlet cavity $V_B$, and a main valve control cavity $V_C$, a main valve oil inlet A is in communication with a feedback groove M through an internal flow channel of the main valve core 1, the feedback groove M is in communication with the main valve control cavity $V_C$ through a throttling edge on a valve sleeve, the main valve control cavity $V_C$ is in communication with a flow sensor oil inlet B, a flow sensor oil outlet C is in communication with a pilot valve oil inlet H, and a pilot valve oil outlet F is in communication with a main valve oil outlet D;

the control cavity pressure sensor 17 is in communication with the main valve control cavity $V_C$; the oil inlet pressure sensor 18 is in communication with the main valve oil inlet A; the oil outlet pressure sensor 19 is in communication with the main valve oil outlet D; and the temperature sensor 20 is in communication with the main valve oil outlet D;

the proportional pilot valve 12 comprises a pilot valve core 11, a pilot valve spring 10, a pilot valve electromagnet 13, a proportional amplifier 14, a flow controller 15, and a displacement sensor 16, an output end of the proportional amplifier 14 is connected to the pilot valve electromagnet 13, the flow controller 15 receives a flow setting signal $q_s$ and a flow feedback signal $q_f$, an output end of the flow controller 15 is connected to an input end of the proportional amplifier 14, the displacement sensor 16 detects displacement of the pilot valve core 11, and outputs a pilot valve core displacement signal y to a feedback end of the proportional amplifier 14;

the multifunctional valve controller 21 comprises a signal processing module 22, a calculation module 23, an integration module 24, a data storage module 25, a control module 26, a display module 27, a fault prediction module 28, and a communication interaction module 29;

the signal processing module 22 comprises a digital filter and a normalization processor, wherein the pilot valve core displacement signal y, a control cavity pressure signal $p_C$, an oil inlet pressure signal $P_A$, an oil outlet pressure signal $p_B$, a flow sensor signal $q_p$, and a temperature sensor signal T are connected to the digital filter of the signal processing module, an output signal of the digital filter is connected to the normalization processor, an output signal of the normalization processor is connected to an output end of the signal processing module, the output end of the signal processing module is connected to the calculation module 23 and an input end of the data storage module 25; and an output end of the calculation module 23 is connected to an input end of the integration module 24 and the input end of the data storage module 25; the calculation module 23 inputs the calculated flow feedback signal q to a feedback end of the flow controller 15; an output end of the integration module 24 is connected to the input end of the data storage module 25, the data storage module 25 is connected to an input end of the control module 26, an input end of the display module 27, an input end of the fault prediction module 28 and an input end of the communication interaction module 29 through a bidirectional data bus; and an output end of the communication interaction module 29 is connected to the cloud storage 30.

The control module 26 calculates the flow setting signal $q_s$ and inputs the flow setting signal $q_s$ to an input end of the flow controller 15; and the control module 26 calculates a flow sensor compensation signal $u_z$ and inputs the signal to an electro-mechanical converter of the flow sensor.

According to the multifunctional electro-hydraulic flow control valve, the flow sensor comprises: a flow sensor valve core 5, a flow sensor spring 6, a hydraulic resistor 7, an electro-mechanical converter 8 and a second displacement sensor 9, the flow sensor oil outlet C is in communication with a flow sensor spring cavity Vy through the hydraulic resistor 7, the flow sensor valve core 5, the flow sensor spring 6, the electro-mechanical converter 8 and the second displacement sensor 9 are coaxially connected, an output force of the electro-mechanical converter 8 acts on an end surface of the flow sensor valve core, and the flow sensor oil outlet C is in communication with the pilot valve oil inlet H.

According to the multifunctional electro-hydraulic flow control valve, the flow sensor comprises: a spool valve sleeve 31, a spool valve core 32, a second hydraulic resistor 33, a third displacement sensor 34, a left end surface spring 35, a right end surface spring 36 and a second electro-mechanical converter 37, the spool valve core 32, the third displacement sensor 34, the left surface face spring 35, the right end surface spring 36 and the second electro-mechanical converter 37 are coaxially connected, an output force of the second electro-mechanical converter acts on a right end surface of the valve core, the flow sensor oil outlet C is in communication with a right end containing cavity $V_F$ of the flow sensor through the second hydraulic resistor 33, a left end containing cavity $V_E$ of the flow sensor is in communication with the flow sensor oil inlet B, and the control module 26 calculates the flow sensor compensation signal $u_z$ and inputs the signal to the second electro-mechanical converter 37.

According to the multifunctional electro-hydraulic flow control valve, the flow sensor 4 is connected between the main valve control cavity $V_C$ and the pilot valve oil inlet H, the main valve control cavity $V_C$ is in communication with the pilot valve oil inlet H, the pilot valve oil outlet F is in communication with the flow sensor oil inlet B, and the flow sensor oil outlet C is in communication with the main valve oil outlet D.

According to the multifunctional electro-hydraulic flow control valve, the calculation module 23 calculates following parameters according to a calculation formula (1), a calculation formula (2), a calculation formula (3), a calculation formula (4), a calculation formula (5) and a calculation formula (6):

$$\text{main valve flow } q=(g(x)+1)\cdot q_b \tag{1}$$

$$\text{pressure difference between an inlet and an outlet of the main valve} \Delta p = P_A - P_B \tag{2}$$

$$\text{main valve input power } P_1 = P_A \cdot q \tag{3}$$

$$\text{main valve output power } P_2 = P_B \cdot q \tag{4}$$

$$\text{main valve throttling loss power } P_3 = \Delta p \cdot q \tag{5}$$

$$\text{flow feedback signal } q_f = k \cdot q_b \tag{6};$$

in the formulae, g(x) refers to flow amplification coefficient, $q_b$ refers to flow sensor signal, $p_A$ refers to oil inlet pressure signal, $p_B$ refers to oil outlet pressure signal, and k refers to flow feedback gain.

According to the multifunctional electro-hydraulic flow control valve, the integration module performs integral calculation to obtain following parameters according to a formula (7), a calculation formula (8), a calculation formula (9) and a calculation formula (10):

$$\text{main valve input energy } E_1 = \int_0^1 P_1 dt \tag{7}$$

$$\text{main valve output energy } E_2 = \int_0^1 P_2 dt \tag{8}$$

$$\text{main valve throttling loss energy } E_3 = \int_0^1 P_3 dt \tag{9}$$

main valve efficiency $$\eta = \frac{E_2}{E_1}; \tag{10}$$

According to the multifunctional electro-hydraulic flow control valve, the fault prediction module 28 performs active operation and maintenance and fault early warning on an integrated unit according to the stored main valve input power $P_1$, the main valve input energy $E_1$, the oil inlet pressure signal $p_A$ and the oil outlet pressure signal $p_B$; once the accumulated energy reaches a fault alarm threshold $g_y$, the system actively performs detection and maintenance, completes identification work from fault characteristics to fault causes by using expert knowledge and expert database, accurately gives fault location and analyzes fault diagnosis results, and is capable of predicting a service life of the valve, diagnosis and prediction results are transmitted to the data storage module, and the display module 27 displays information stored in the data storage module 25 in real time.

According to the multifunctional electro-hydraulic flow control valve, the communication interaction module 29 is an Ethernet, an industrial Internet, or a Bluetooth, and transmits data stored in the data storage module 25 to the cloud storage 30, and receives data information stored in the cloud storage.

A flow control method using a multifunctional electro-hydraulic flow control valve comprises the following steps of:

step 1: receiving, by a calculation module 23, a pilot valve core displacement signal y, a control cavity pressure signal $p_C$, an oil inlet pressure signal $p_A$, an oil outlet pressure signal $p_B$, a flow sensor signal $q_p$ and a temperature sensor signal T output by a sensor; and inputting a main valve flow q, a flow feedback signal $q_f$, a pressure difference between an inlet and an outlet of the main valve $\Delta p$, a main valve input power $P_1$, a main valve output power $P_2$ and the main valve throttling loss power $P_3$ which are calculated by using the received data to an integration module 24;

step 2: receiving, by the integration module 24, the output data of the calculation module 23, and performing integral calculation to obtain a main valve input energy $E_1$, a main valve output energy $E_2$, a main valve throttling loss energy $E_3$ and a main valve efficiency n; and inputting the data of the calculation module and the integration module together to a data storage module 25;

step 3: receiving, by a flow controller 15, a flow setting signal $q_s$ output by a control module 26 and the flow feedback signal q calculated by the calculation module 23 in step 1, and calculating, by the flow controller, an output control signal and controlling a pilot valve electromagnet 13 through an amplifier; and meanwhile, receiving, by an electric-mechanical converter 8, a flow sensor compensation signal $u_z$ output by the control module 26; and step 4: displaying, by a display module 27, information stored in the data storage module 25 in real time through a program; performing, by a fault prediction module 28, active operation and maintenance and fault early warning on the integrated unit according to the stored main valve signal, and once the accumulated energy reaches a fault alarm threshold $g_y$, actively performing, a system, detection and maintenance, completing the identification work from fault characteristics to fault causes by using expert knowledge and expert database, accurately giving fault location and analyzing fault diagnosis results, and predicting a service life of the valve at the same time; and transmitting, by a communication interaction module 29 being an Ethernet, an industrial Internet, or a Bluetooth, the data stored in the data storage module 25 to a cloud storage 30, and receiving data information stored in the cloud storage.

The present invention has the following beneficial effects:

1. The present invention does not need to install a pressure compensator in the system, but control the flow of the pilot valve through closed loop, which can continuously control the flow of the main valve without the influence of load change after being amplified by the main valve, and has the advantages of low pressure loss and wide flow control range.

2. The present invention can detect and control the flow of the actuator with high precision without installing a flow sensor in a main oil channel of a hydraulic system, which solves the problems that the existing flow sensor cannot control the flow through closed loop, has high cost, is not easy to install, has large pressure loss and the like, and the flow control valve has the function of the flow sensor, thus realizing the integration of flow detection and control.

3. The present invention can monitor the flow, power, energy, efficiency and other information of each part in the hydraulic system in real time, and can store and upload the information to the cloud storage in real time, which lays a foundation for further optimizing the energy efficiency of the system as it is inconvenient to obtain power and energy information in the existing hydraulic system.

4. Through real-time monitoring and analysis of power and energy information, the present invention can actively maintain and diagnose a life cycle of the control valve, and realize state monitoring, life prediction and fault location of key elements of the control valve.

Wherein: 1—main valve core, 2—main valve, 3—main valve spring, 4—flow sensor, 5—flow sensor valve core, 6—flow sensor spring, 7—hydraulic resistor, 8—electro-mechanical converter, 9—second displacement sensor, 10—pilot valve spring, 11—pilot valve core, 12—proportional pilot valve, 13—pilot valve electromagnet, 14—proportional amplifier, 15—flow controller, 16—displacement sensor, 17—control cavity pressure sensor, 18—oil inlet pressure sensor, 19—oil outlet pressure sensor, 20—temperature sensor, 21—multifunctional valve controller, 22—signal processing module, 23—calculation module, 24—integration module, 25—data storage module, 26—control module, 27—display module, 28—fault prediction module, 29—communication interaction module, 30—cloud storage, 31—spool valve sleeve, 32—spool valve core, 33—second hydraulic resistor, 34—third displacement sensor, 35—left end surface spring, 36—right end surface spring, and 37—second electro-mechanical converter.

$V_A$—main valve oil inlet cavity, $V_B$—main valve oil outlet cavity, $V_C$—main valve control cavity, $V_Z$—flow sensor oil inlet cavity, $V_Y$—flow sensor spring cavity, A—main valve oil inlet, B—flow sensor oil inlet, C—flow sensor oil outlet, D—main valve oil outlet, H—pilot valve oil inlet, F—pilot valve oil outlet, M—feedback groove, N—valve core left end surface, R—valve core right end surface, U—spool valve core left end surface, W—spool valve core right end surface, $V_E$—flow sensor left end cavity, and $V_F$—flow sensor right end cavity.

$p_A$—oil inlet pressure signal, $P_B$—oil outlet pressure signal, $p_C$—control cavity pressure signal, $q_b$—flow sensor signal, T—temperature sensor signal, $q_s$—flow setting signal, $q_f$—flow feedback signal, y—pilot valve core displacement signal, g(x)—flow amplification factor, q—main valve flow, $\Delta p$—pressure difference between inlet and outlet of main valve, $P_1$—main valve input power, $P_2$—main valve output power, $P_3$—main valve throttling loss power, $E_1$—main valve input energy, $E_2$—main valve output energy, $E_3$—main valve throttling loss energy, η—main valve efficiency, $g_y$—fault alarm threshold, k—flow feedback gain, and $u_z$—flow sensor compensation signal.

DETAILED DESCRIPTION OF PREFERRED EMBODIMENTS

The principle and structure of the present invention will be further explained in detail with reference to the drawings and embodiments, so that those of ordinary skills in the art can understand and implement the present invention after reading the specific embodiments. The embodiments are detailed description of the present invention, and do not impose any restrictions on the present invention.

First Embodiment

Figure 1:
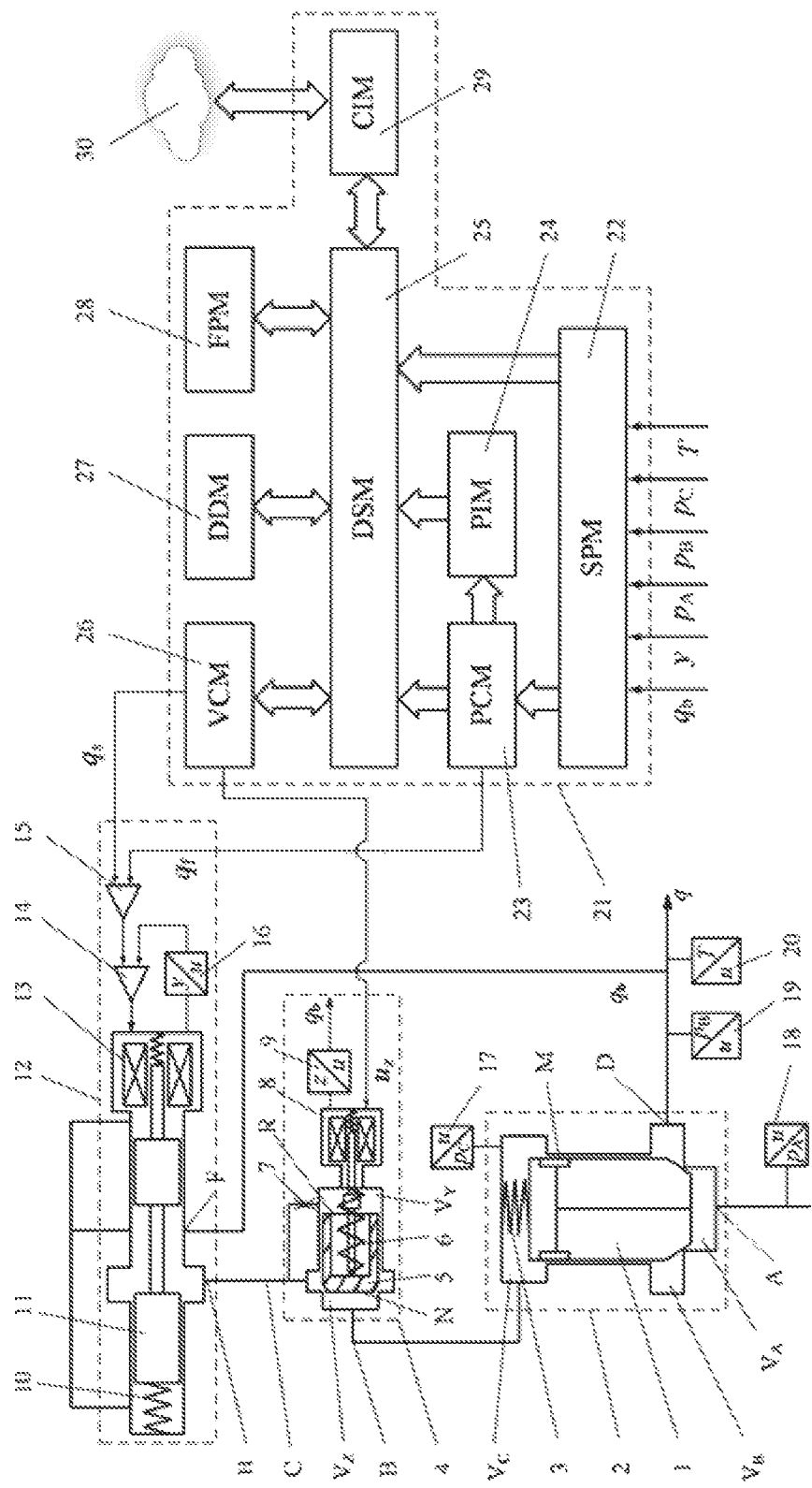
FIG. 1 is a schematic diagram of a multifunctional electro-hydraulic flow control valve in the first embodiment of the present invention.

As shown in FIG. 1, a multifunctional electro-hydraulic flow control valve comprises a main valve 2 and a proportional pilot valve 12; further, a flow sensor 4, a multifunctional valve controller 21, a control cavity pressure sensor 17, an oil inlet pressure sensor 18, an oil outlet pressure sensor 19, and a temperature sensor 20 are additionally provided.

A main valve oil inlet A is in communication with a feedback groove M through an internal flow channel of the main valve core 1, the feedback groove M is in communication with the main valve control cavity $V_C$ through a throttling edge on a valve sleeve, the main valve control cavity $V_C$ is in communication with a flow sensor oil inlet B, a flow sensor oil outlet C is in communication with a pilot valve oil inlet H, and a pilot valve oil outlet F is in communication with a main valve oil outlet D.

The feedback groove M in the main valve core 1 and an internal flow channel of the valve core are in communication with the main valve control cavity $V_C$ and the main valve oil inlet A, which is the basis for realizing a flow-displacement feedback function. When the proportional pilot valve 12 is closed, a fluid flows into the main valve control cavity $V_C$ through the feedback groove M due to a pre-opening amount of the feedback groove M. In this case, an inlet pressure and a control cavity pressure are almost completely equal, and the main valve core remains closed under the effect of an area difference. When the proportional pilot valve 12 is opened, the feedback groove M in the main valve core and a pilot valve opening form an A-type hydraulic half-bridge, and a fluid at the main valve oil inlet flows out through the feedback groove M and the proportional pilot valve, so that the pressure in the control cavity is less than the inlet pressure of the main valve. When the pressure in the control cavity is less than a certain value, the main valve core will be opened, and a flow area of the feedback groove M will also be increased after the main valve core 1 is opened, until pressures at upper and lower ends of the valve core are equal and the valve core is balanced.

The flow sensor 4 is of a plug-in type and comprises: a flow sensor valve core 5, a flow sensor spring 6, a hydraulic resistor 7, an electro-mechanical converter 8 and a second displacement sensor 9. The flow sensor oil inlet B is in communication with the flow sensor oil inlet cavity $V_Z$, the flow sensor valve core 5, the flow sensor spring 6, the electro-mechanical convert 8 and the second displacement sensor 9 are coaxially connected, an output force of the electro-mechanical converter 8 acts on an end surface of the flow sensor valve core, and the flow sensor oil outlet C is in communication with the pilot valve oil inlet H. An input end of the electro-mechanical converter 8 is connected with a control module. The control module 26 calculates the flow sensor compensation signal $u_z$ and inputs the signal to the second electro-mechanical converter 8.

The flow sensor 4 is installed between the main valve control cavity $V_C$ and the proportional pilot valve oil inlet H, and the flow sensor oil outlet C is in communication with the flow sensor spring cavity $V_Y$ through the hydraulic resistor 7. The pressure of the flow sensor oil inlet B acts on a valve core left end surface N of the flow sensor valve core 5, and the flow through the flow sensor is proportional to a valve opening pressure difference, so that the flow sensor valve core is opened by the hydraulic pressure, and a hydraulic pressure, a hydraulic force and a spring force on the flow sensor valve core are balanced. Because the flow sensor signal $q_b$ has a linear relationship with displacement of the flow sensor valve core 5, the displacement of the flow sensor valve core 5 is measured by the second displacement sensor 9, so that the flow sensor signal q can be obtained.

The accuracy of the flow sensor may be affected by oil temperature change and hydrodynamic force. A temperature of the oil in the flow valve is measured by the temperature sensor 20, and the control module 26 feeds back the compensation signal $u_z$ to the electro-mechanical converter 8 to compensate the nonlinear relationship between the flow rate and the displacement z of the flow sensor valve core 5, thus reducing the influence of the temperature and the hydrodynamic force on the flow measured.

The control cavity pressure sensor 17 is in communication with the main valve control cavity $V_C$ to output a control cavity pressure signal $P_C$; the oil inlet pressure sensor 18 is in communication with the main valve oil inlet A to output an oil inlet pressure signal $p_A$; the oil outlet pressure sensor 19 is in communication with the main valve oil outlet D to output an oil outlet pressure signal $p_B$; and the temperature sensor 20 is in communication with the main valve oil outlet D to output a temperature sensor signal T.

An output end of the proportional amplifier 14 is connected to the pilot valve electromagnet 13, the flow controller 15 receives a flow setting signal $q_s$ and a flow feedback signal $q_f$, and an output end of the flow controller 15 is connected to an input end of the proportional amplifier 14. The pilot valve electromagnet 13 receives a signal from the proportional amplifier 14, and an output force thereof and a spring force of a pilot valve spring 10 jointly control displacement of a pilot valve core 11. The displacement sensor 16 detects displacement of the pilot valve core 11, and outputs a pilot valve core displacement signal y to a feedback end of the proportional amplifier 14.

The multifunctional valve controller 21 comprises a signal processing module 22, a calculation module 23, an integration module 24, a data storage module 25, a control module 26, a display module 27, a fault prediction module 28, and a communication interaction module 29.

The data storage module 25 is connected to the control module 26, the display module 27, the fault prediction module 28 and the communication interaction module 29 through a bidirectional data bus.

The signal processing module 22 receives the pilot valve core displacement signal y, a control cavity pressure signal $p_C$, an oil inlet pressure signal $p_A$, an oil outlet pressure signal $p_B$, a flow sensor signal $q_f$, and a temperature sensor signal 7. After the signal processing module filters and normalizes the above signals, the signals are input to the calculation module 23 and an input end of the data storage module 25 through an output end of the signal processing module.

The control module 26 calculates the flow setting signal $q_s$, and the flow setting signal $q_s$ is connected to an input end of the flow controller 15. All the data in the data storage module 25 are analyzed, compared, judged and associated, and knowledge is continuously accumulated. According to the changes of load pressure and oil temperature, a multi-control mode switching strategy based on working condition identification may be designed to realize displacement closed-loop control and flow closed-loop control mode to adapt to the changes of external environment. In addition, PID control, fuzzy control, neural network, deep learning and other algorithms are used to realize functions of parallel regulation, state monitoring, self-learning and self-adaptation of electro-hydraulic proportional flow direction continuous control valve.

The calculation module 23 calculates following parameters according to a calculation formula (1), a calculation formula (2), a calculation formula (3), a calculation formula (4), a calculation formula (5) and a calculation formula (6):

$$\text{main valve flow } q=(g(x)+1)\cdot q_b \quad (1)$$

$$\text{pressure difference between an inlet and an outlet of the main valve} \Delta p = P_A - P_B \quad (2)$$

$$\text{main valve input power } P_1 = P_A \cdot q \quad (3)$$

$$\text{main valve output power } P_2 = P_B \cdot q \quad (4)$$

$$\text{main valve throttling loss power } P_3 = \Delta p \cdot q \quad (5)$$

$$\text{flow feedback signal } q_f = k \cdot q_b \quad (6).$$

The calculation module 23 inputs the main valve flow q, the flow feedback signal $q_f$, the pressure difference $\Delta p$ between an inlet and an outlet of the main valve, the main valve input power $P_1$, the main valve output power $P_2$ and the main valve throttling loss power $P_3$ calculated to an input end of the integration module 24 and the data storage module 25. The calculation module 23 inputs the calculated flow feedback signal $q_f$ to a feedback end of the flow controller 15.

The integration module performs integral calculation to obtain following parameters according to a formula (7), a calculation formula (8), a calculation formula (9) and a calculation formula (10):

$$\text{main valve input energy } E_1 = \int_0^1 P_1 dt \quad (7)$$

$$\text{main valve output energy } E_2 = \int_0^1 P_2 dt \quad (8)$$

$$\text{main valve throttling loss energy } E_3 = \int_0^1 P_3 dt \quad (9)$$

main valve efficiency $$\eta = \frac{E_2}{E_1}. \quad (10)$$

The main valve input energy $E_1$, the main valve output energy $E_2$, the main valve throttling loss energy $E_3$ and the main valve efficiency η calculated by the integration module 24 are input to the data storage module 25.

The display module 27 displays information stored in the data storage module 25 in real time through a program, comprising a dynamic signal curve for displaying state parameters such as the flow sensor signal $q_b$, the oil inlet pressure signal $p_A$, the oil outlet pressure signal $P_B$, the pilot valve core displacement signal y, the temperature sensor signal 7, the main valve flow q, the main valve input power $P_1$, the main valve output power $P_2$, the main valve throttling loss power $P_3$, the main valve input energy $E_1$, the main valve output energy $E_2$, the main valve throttling loss energy $E_3$ and the main valve efficiency n in real time.

The fault prediction module 28 performs active operation and maintenance and fault early warning on the integrated unit according to the stored signals such as the main valve input power $P_1$, the main valve input energy $E_1$, the oil inlet pressure signal $p_A$, the oil outlet pressure signal $p_B$ and the like, and once the accumulated energy reaches the fault alarm threshold $g_y$, the system may actively perform detection and maintenance, complete the identification work from fault characteristics to fault causes by using expert knowledge and expert database, accurately give fault location and analyze fault diagnosis results, and predict the service life of the valve at the same time.

The communication interaction module 29 is an Ethernet, an industrial Internet, or a Bluetooth, and transmits the data stored in the data storage module 25 to a cloud storage 30, and receives data information stored in the cloud storage.

A flow control method using a multifunctional electro-hydraulic flow control valve comprises the following steps of:

step 1: receiving, by a calculation module 23, a pilot valve core displacement signal y, a control cavity pressure signal $p_C$, an oil inlet pressure signal $p_A$, an oil outlet pressure signal $p_B$, a flow sensor signal $q_p$ and a temperature sensor signal T output by a sensor; and inputting a main valve flow q, a flow feedback signal $q_f$, a pressure difference between an inlet and an outlet of the main valve $\Delta p$, a main valve input power $P_1$, a main valve output power $P_2$ and the main valve throttling loss power $P_3$ which are calculated by using the received data to an integration module 24;

step 2: receiving, by the integration module 24, the output data of the calculation module 23, and performing integral calculation to obtain a main valve input energy $E_1$, a main valve output energy $E_2$, a main valve throttling loss energy $E_3$ and a main valve efficiency η and inputting the data of the calculation module and the integration module together to a data storage module 25;

step 3: receiving, by a flow controller 15, a flow setting signal $q_s$ output by a control module 26 and the flow feedback signal $q_f$ calculated by the calculation module 23 in step 1, and calculating, by the flow controller, an output control signal and controlling a pilot valve electromagnet 13 through an amplifier; and meanwhile, receiving, by an electric-mechanical converter 8, a flow sensor compensation signal $u_z$ output by the control module 26; and step 4: displaying, by a display module 27, information stored in the data storage module 25 in real time through a program; performing, by a fault prediction module 28, active operation and maintenance and fault early warning on the integrated unit according to the stored main valve signal, and once the accumulated energy reaches a fault alarm threshold $g_y$, actively performing, a system, detection and maintenance, completing the identification work from fault characteristics to fault causes by using expert knowledge and expert database, accurately giving fault location and analyzing fault diagnosis results, and predicting a service life of the valve at the same time; and transmitting, by a communication interaction module 29 being an Ethernet, an industrial Internet, or a Bluetooth, the data stored in the data storage module 25 to a cloud storage 30, and receiving data information stored in the cloud storage.

Second Embodiment

The second embodiment of the multifunctional electro-hydraulic flow control valve of the present invention is the same as the first embodiment in structure and function, but the difference is that the structure of the flow sensor 4 is changed.

Figure 2:
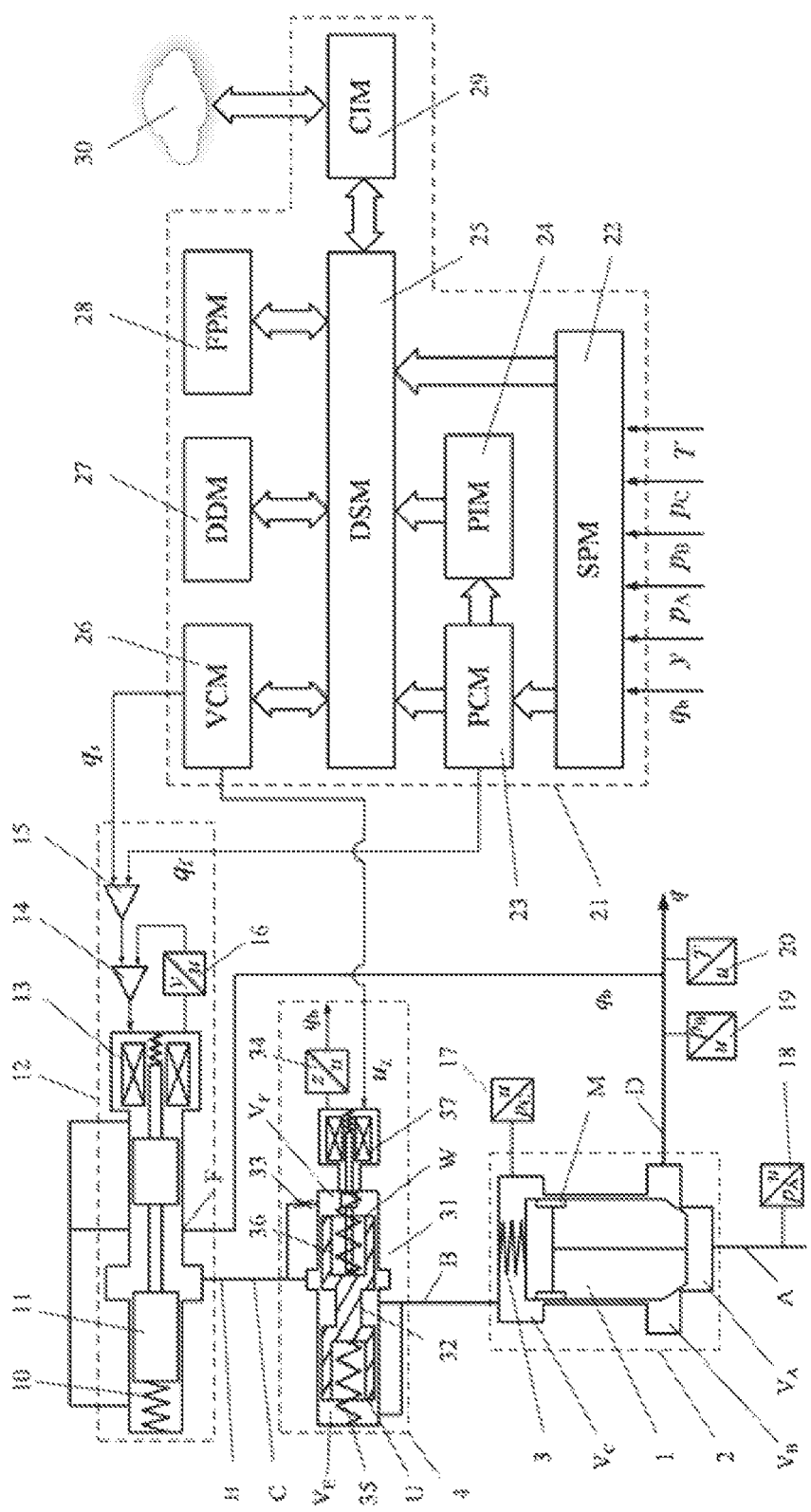
FIG. 2 is a schematic diagram of a multifunctional electro-hydraulic flow control valve in the second embodiment of the present invention.

As shown in FIG. 2, the specific implementation is to use a spool valve flow sensor, which comprises a spool valve sleeve 31, a spool valve core 32, a second hydraulic resistor 33, a third displacement sensor 34, a left end surface spring 35, a right end surface spring 36, and a second electro-mechanical converter 37. The spool valve core 32, the third displacement sensor 34, the left end surface spring 35, the right end surface spring 36 and the second electro-mechanical converter 37 are coaxially connected. An output force of the second electro-mechanical converter 37 acts on a right end surface W of the spool valve core, the flow sensor oil outlet C is in communication with a right end containing cavity $V_F$ of the flow sensor through the second hydraulic resistor 33, and a left end containing cavity $V_E$ of the flow sensor is in communication with the flow sensor oil inlet B. The control module 26 calculates the flow sensor compensation signal $u_z$ and inputs the signal to the second electro-mechanical converter 37.

In the above embodiment, the spool valve flow sensor is installed between the main valve control cavity $V_C$ and the pilot valve oil inlet H. The electro-mechanical converter 8, the left end surface spring 35 and the right end surface spring 36 are coaxially arranged with the spool valve core 32, the flow sensor oil inlet B is in communication with the left end containing cavity $V_C$ of the flow sensor, and the flow sensor oil outlet C is in communication with the right end containing cavity $V_F$ of the flow sensor through the second hydraulic resistor 33. The flow through the flow sensor is proportional to a valve opening pressure difference, so that the flow sensor valve core is opened by the hydraulic pressure, and a hydraulic pressure, a hydraulic force and a spring force on the flow sensor valve core are balanced. Because the flow sensor signal $g_b$ has a linear relationship with displacement of the spool valve core 32, the displacement of the flow sensor valve core is measured by the third displacement sensor 34, so that the flow sensor signal g can be obtained.

We claim:

1. A multifunctional electro-hydraulic flow control valve, comprising a main valve (2) and a proportional pilot valve (12), wherein a flow sensor, a multifunctional valve controller (21), a control cavity pressure sensor (17), an oil inlet pressure sensor (18), an oil outlet pressure sensor (19), a temperature sensor (20), and a cloud storage (30) are additionally provided;

the main valve (2) comprises a main valve core (1), a main valve spring (3), a main valve oil inlet cavity $V_A$, a main valve oil outlet cavity $V_B$, and a main valve control cavity $V_C$, a main valve oil inlet A is in communication with a feedback groove M through an internal flow channel of the main valve core (1), the feedback groove M is in communication with the main valve control cavity $V_C$ through a throttling edge on a valve sleeve, the main valve control cavity $V_C$ is in communication with a flow sensor oil inlet B, a flow sensor oil outlet C is in communication with a pilot valve oil inlet H, and a pilot valve oil outlet F is in communication with a main valve oil outlet D; the control cavity pressure sensor (17) is in communication with the main valve control cavity $V_C$; the oil inlet pressure sensor (18) is in communication with the main valve oil inlet A; the oil outlet pressure sensor (19) is in communication with the main valve oil outlet D; and the temperature sensor (20) is in communication with the main valve oil outlet D;

the proportional pilot valve (12) comprises a pilot valve core (11), a pilot valve spring (10), a pilot valve electromagnet (13), a proportional amplifier (14), a flow controller (15), and a displacement sensor (16), an output end of the proportional amplifier (14) is connected to the pilot valve electromagnet (13), the flow controller (15) receives a flow setting signal $q_s$ and a flow feedback signal $q_f$, an output end of the flow controller (15) is connected to an input end of the proportional amplifier (14), the displacement sensor (16) detects displacement of the pilot valve core (11), and outputs a pilot valve core displacement signal y to a feedback end of the proportional amplifier (14);

the multifunctional valve controller (21) comprises a signal processing module (22), a calculation module (23), an integration module (24), a data storage module (25), a control module (26), a display module (27), a fault prediction module (28), and a communication interaction module (29);

the signal processing module (22) comprises a digital filter and a normalization processor, wherein the pilot valve core displacement signal y, a control cavity pressure signal $p_C$, an oil inlet pressure signal $p_A$, an oil outlet pressure signal $p_B$, a flow sensor signal $q_p$, and a temperature sensor signal T are connected to the digital filter of the signal processing module, an output signal of the digital filter is connected to the normalization processor, an output signal of the normalization processor is connected to an output end of the signal processing module, the output end of the signal processing module is connected to the calculation module (23) and an input end of the data storage module (25);

an output end of the calculation module (23) is connected to an input end of the integration module (24) and the input end of the data storage module (25); the calculation module (23) inputs the calculated flow feedback signal $q_f$ to a feedback end of the flow controller (15); an output end of the integration module (24) is connected to the input end of the data storage module (25), the data storage module (25) is connected to an input end of the control module (26), an input end of the display module (27), an input end of the fault prediction module (28) and an input end of the communication interaction module (29) through a bidirectional data bus; and an output end of the communication interaction module (29) is connected to the cloud storage (30);

the control module (26) calculates the flow setting signal $q_s$ and inputs the flow setting signal $q_s$ to an input end of the flow controller (15); and the control module (26) calculates a flow sensor compensation signal $u_z$ and inputs the signal to an electro-mechanical converter of the flow sensor;

the flow sensor is connected between the main valve control cavity $V_C$ and the pilot valve oil inlet H, the main valve control cavity $V_C$ is in communication with the pilot valve oil inlet H, the pilot valve oil outlet F is in communication with the flow sensor oil inlet B, and the flow sensor oil outlet C is in communication with the main valve oil outlet D;

the calculation module (23) calculates following parameters according to a calculation formula (1), a calculation formula (2), a calculation formula (3), a calculation formula (4), a calculation formula (5) and a calculation formula (6):

$$\text{main valve flow } q=(g(x)+1)\cdot q_b \quad (1)$$

$$\text{pressure difference between an inlet and an outlet of the main valve} \Delta p = P_A - P_B \quad (2)$$

$$\text{main valve input power } P_1 = P_A \cdot q \quad (3)$$

$$\text{main valve output power } P_2 = P_B \cdot q \quad (4)$$

$$\text{main valve throttling loss power } P_3 = \Delta p \cdot q \quad (5)$$

$$\text{flow feedback signal } q_f = k \cdot q_b \quad (6);$$

the integration module performs integral calculation to obtain following parameters according to a formula (7), a calculation formula (8), a calculation formula (9) and a calculation formula (10):

$$\text{main valve input energy } E_1 = \int_0^1 P_1 dt \quad (7)$$

$$\text{main valve output energy } E_2 = \int_0^1 P_2 dt \quad (8)$$

$$\text{main valve throttling loss energy } E_3 = \int_0^1 P_3 dt \quad (9)$$

$$\text{main valve efficiency } \eta = E_2/E_1 \quad (10);$$

in the formulae, g(x) refers to flow amplification coefficient, qb refers to flow sensor signal, pA refers to oil inlet pressure signal, pB refers to oil outlet pressure signal, and k refers to flow feedback gain;

the fault prediction module (28) performs active operation and maintenance and fault early warning on an integrated unit according to the stored main valve input power $P_1$, the main valve input energy E1, the oil inlet pressure signal $p_A$ and the oil outlet pressure signal $p_B$; once the accumulated energy reaches a fault alarm threshold $g_y$, the system actively performs detection and maintenance, completes identification work from fault characteristics to fault causes, accurately gives fault location and analyzes fault diagnosis results, and is capable of predicting a service life of the valve, diagnosis and prediction results are transmitted to the data storage module, and the display module (27) displays information stored in the data storage module (25) in real time.

2. The multifunctional electro-hydraulic flow control valve according to claim 1, wherein the flow sensor comprises: a flow sensor valve core (5), a flow sensor spring (6), a hydraulic resistor (7), an electro-mechanical converter (8) and a second displacement sensor (9), the flow sensor oil outlet C is in communication with a flow sensor spring cavity Vy through the hydraulic resistor (7), the flow sensor valve core (5), the flow sensor spring (6), the electro-mechanical converter (8) and the second displacement sensor (9) are coaxially connected, an output force of the electro-mechanical converter (8) acts on an end surface of the flow sensor valve core, and the flow sensor oil outlet C is in communication with the pilot valve oil inlet H.

3. The multifunctional electro-hydraulic flow control valve according to claim 1, wherein the flow sensor comprises: a spool valve sleeve (31), a spool valve core (32), a second hydraulic resistor (33), a third displacement sensor (34), a left end surface spring (35), a right end surface spring (36) and a second electro-mechanical converter (37), the spool valve core (32), the third displacement sensor (34), the left surface face spring (35), the right end surface spring (36) and the second electro-mechanical converter (37) are coaxially connected, an output force of the second electro-mechanical converter acts on a right end surface of the valve core, the flow sensor oil outlet C is in communication with a right end containing cavity $V_F$ of the flow sensor through the second hydraulic resistor (33), a left end containing cavity $V_E$ of the flow sensor is in communication with the flow sensor oil inlet B, and the control module (26) calculates the flow sensor compensation signal $u_z$ and inputs the signal to the second electro-mechanical converter (37).

4. The multifunctional electro-hydraulic flow control valve according to claim 1, wherein the communication interaction module (29) is an Ethernet, an industrial Internet, or a Bluetooth, and transmits data stored in the data storage module (25) to the cloud storage (30), and receives data information stored in the cloud storage.

5. A flow control method using the multifunctional electro-hydraulic flow control valve according to claim 1, comprising the following steps of:

step 1: receiving, by the calculation module (23), the pilot valve core displacement signal y, the control cavity pressure signal $p_C$, the oil inlet pressure signal $p_A$, the oil outlet pressure signal $p_B$, the flow sensor signal $q_p$ and the temperature sensor signal T output by the sensor; and inputting the main valve flow q, the flow feedback signal $q_f$, the pressure difference between the inlet and the outlet of the main valve $\Delta p$, the main valve input power $P_1$, the main valve output power $P_2$ and the main valve throttling loss power $P_3$ which are calculated by using the received data to the integration module (24);

step 2: receiving, by the integration module (24), the output data of the calculation module (23), and performing integral calculation to obtain the main valve input energy $E_1$, the main valve output energy $E_2$, the main valve throttling loss energy $E_3$ and the main valve efficiency $\eta$; and inputting the data of the calculation module and the integration module together to the data storage module (25);

step 3: receiving, by the flow controller (15), the flow setting signal $q_s$ output by the control module (26) and the flow feedback signal $q_f$ calculated by the calculation module (23) in step 1, and calculating, by the flow controller, an output control signal and controlling the pilot valve electromagnet (13) through an amplifier; and meanwhile, receiving, by the electric-mechanical converter (8), the flow sensor compensation signal $u_z$ output by the control module (26); and step 4: displaying, by the display module (27), information stored in the data storage module (25) in real time through a program; performing, by the fault prediction module (28), active operation and maintenance and fault early warning on the integrated unit according to the stored main valve signal, and once the accumulated energy reaches the fault alarm threshold $g_y$, actively performing, by the system, detection and maintenance, completing the identification work from fault characteristics to fault causes, accurately giving fault location and analyzing fault diagnosis results, and predicting the service life of the valve at the same time; and transmitting, by the communication interaction module (29) being an Ethernet, an industrial Internet, or a Bluetooth, the data stored in the data storage module (25) to the cloud storage (30), and receiving data information stored in the cloud storage.

* * * * *